(12) United States Patent
Gumiero et al.

(10) Patent No.: US 11,590,956 B2
(45) Date of Patent: Feb. 28, 2023

(54) HYDRAULIC COMPONENT FOR HYDRAULIC SYSTEMS, IN PARTICULAR FOR BRAKING SYSTEMS OR HYDRAULIC CLUTCH DRIVES, IN THE AUTOMOTIVE SECTOR

(71) Applicant: FRENI BREMBO S.P.A., Curno (IT)

(72) Inventors: Niccolò Gumiero, Curno (IT); Alessandro Esposito, Curno (IT)

(73) Assignee: Brembo S.p.A., Curno (IT)

( * ) Notice: Subject to any disclaimer, the term of this patent is extended or adjusted under 35 U.S.C. 154(b) by 380 days.

(21) Appl. No.: 16/485,851

(22) PCT Filed: Feb. 16, 2018

(86) PCT No.: PCT/IB2018/050959
§ 371 (c)(1),
(2) Date: Aug. 14, 2019

(87) PCT Pub. No.: WO2018/150365
PCT Pub. Date: Aug. 23, 2018

(65) Prior Publication Data
US 2020/0001847 A1 Jan. 2, 2020

(30) Foreign Application Priority Data
Feb. 16, 2017 (IT) .................. 102017000017596

(51) Int. Cl.
*F16L 41/00* (2006.01)
*B60T 17/04* (2006.01)
*F16L 27/087* (2006.01)

(52) U.S. Cl.
CPC .......... *B60T 17/043* (2013.01); *F16L 41/005* (2013.01); *F16L 27/087* (2013.01)

(58) Field of Classification Search
CPC ..... B60T 17/043; F16L 41/005; F16L 27/087; F16L 27/093
See application file for complete search history.

(56) References Cited

U.S. PATENT DOCUMENTS

| 608,852 A | * | 8/1898 | Goss ..................... F16L 27/093 285/190 |
| 2,307,328 A | * | 1/1943 | Martin ................. F16L 41/005 285/190 |

(Continued)

FOREIGN PATENT DOCUMENTS

| CH | 407678 A | * 2/1966 | ............ F16L 27/093 |
| CN | 102661460 A | 9/2012 | |

(Continued)

OTHER PUBLICATIONS

European Patent Office, International Search Report and Written Opinion issued in Application No. PCT/IB2018/050959, dated May 18, 2018, 13 pages, Rijswijk, Netherlands.

*Primary Examiner* — Zachary T Dragicevich
*Assistant Examiner* — James A Linford
(74) *Attorney, Agent, or Firm* — Marshall & Melhorn, LLC

(57) ABSTRACT

A hydraulic component for braking systems and/or clutch drives may have at least one connector and an eyelet. The component may also have an inlet plug that brings fluid into the block. The component may also have at least one upper seal interposed between an upper surface of the eyelet and a head of the inlet plug. The component may also have at least one bottom seal interposed between a lower surface of the eyelet and a base of the block. Between at least one of the upper and lower surfaces of the eyelet and the corresponding head or base a protuberance is interposed, so that (Continued)

in the absence of the corresponding seal, the protuberance creates an interspace allowing the leakage of fluid.

14 Claims, 19 Drawing Sheets

(56) References Cited

U.S. PATENT DOCUMENTS

| | | | | |
|---|---|---|---|---|
| 3,147,015 | A * | 9/1964 | Hanback | F16L 27/093 |
| | | | | 277/626 |
| 3,384,394 | A * | 5/1968 | O'Connor | F16L 5/10 |
| | | | | 285/190 |
| 4,955,643 | A * | 9/1990 | Bona | F16L 27/093 |
| | | | | 285/190 |
| 5,011,192 | A * | 4/1991 | Campo | F16L 41/005 |
| | | | | 285/190 |
| 2003/0042737 | A1 | 3/2003 | Sampson | |
| 2013/0200614 | A1 * | 8/2013 | Tsai | F16L 41/005 |
| | | | | 285/351 |

FOREIGN PATENT DOCUMENTS

| | | | | |
|---|---|---|---|---|
| DE | 2610775 A1 * | 9/1977 | | F16L 41/08 |
| DE | 10309297 A1 * | 9/2004 | | F16L 41/005 |
| DE | 102016101815 A1 * | 8/2017 | | F16L 27/093 |
| FR | 713689 A * | 10/1931 | | F16L 27/093 |
| FR | 1105908 A * | 12/1955 | | F16K 31/002 |
| FR | 1130563 A * | 2/1957 | | G01L 19/0007 |
| GB | 686638 A * | 1/1953 | | F16L 41/005 |
| GB | 2171770 A * | 9/1986 | | F16L 41/005 |
| JP | 2012137481 A | 7/2012 | | |

\* cited by examiner

HYDRAULIC COMPONENT FOR HYDRAULIC SYSTEMS, IN PARTICULAR FOR BRAKING SYSTEMS OR HYDRAULIC CLUTCH DRIVES, IN THE AUTOMOTIVE SECTOR

FIELD OF APPLICATION

The present invention relates to a hydraulic component for hydraulic systems, in particular for braking systems or hydraulic clutch drives of devices, such as brakes and/or clutches, typically in the automotive sector.

PRIOR ART

In particular, in hydraulic systems for the actuation of brakes and/or clutches, a plurality of hydraulic connectors are used which connect together ducts of the hydraulic system which convey the hydraulic fluid from the actuator device, such as a pump, to the final actuation device, such as a brake caliper, the clutch pressure plate and the like.

The hydraulic connections must all ensure the hydraulic seal to the brake fluid, otherwise the presence even of small leaks would cause an inefficiency of the hydraulic system, with also very serious consequence in the case of braking systems.

Typically, the connections consist of a connector that must connect to a block or nut screw by the interposition of an inlet plug. The connector is the terminal part of a pipe that receives the incoming fluid, for example from a further component of the braking system, and an eyelet that sends the outlet fluid.

The inlet plug has the configuration of a hollow cylindrical body which receives the fluid from the connector and feeds it into a threaded hole formed on the block or nut screw.

In order to ensure the tightness of the hydraulic connection, it is necessary to interpose seals between the nut screw and the eyelet and between the under-head of the inlet plug and the eyelet, typically annealed copper washers.

In the wrong case in which one of the sealing washers is not assembled in the connection, the connector, in particular the eyelet, abuts against the nut screw/inlet plug.

This configuration must be avoided, as it does not ensure the hydraulic seal during the whole useful life of the vehicle and therefore there is a real risk of hydraulic fluid leakage during the use of the system.

DISCLOSURE OF THE INVENTION

The possible dangerous absence of even just one of the seals, following an error in the assembly step, is difficult to detect by means of the end of assembly line checks.

Currently, in the known solutions, there is no check of the actual presence of the washer, but only an objectification of the washer taking by the operator by means of suitable timers.

The addition of a further check (e.g. cameras) would result in an increase in production times/costs.

The need to solve the drawbacks and limitations mentioned with reference to the prior art is therefore felt.

Such a need is met by a hydraulic component according to claim 1.

In particular, such a need is met by a hydraulic component, in particular for braking and/or clutch drive systems, comprising at least one connector fitted with a supply pipe, suitable for receiving incoming hydraulic fluid, and an eyelet that sends the fluid in output, an inlet plug with a hollow cylindrical body that receives the fluid in output from the eyelet and brings it into a supply channel made on a block or nut screw, the inlet plug being inserted coaxially to a hole delimited by the eyelet, at least one upper seal interposed between an upper surface of the eyelet and a head of the inlet plug, at least one bottom seal interposed between a lower surface of the eyelet and a base of the block, characterised in that between at least one of said upper and lower surfaces of the eyelet and the corresponding head or base a protuberance is interposed, respectively, above or below designed or configured so that, in the absence of the corresponding seal, the protuberance stops in abutment and creates an interspace between said upper and lower surfaces of the eyelet and the corresponding head or base allowing the leakage of fluid.

According to a possible embodiment, said lower or upper protuberance has an axial thickness less than the corresponding upper or lower seal said thickness being measured parallel to a direction coaxial to a hole of the eyelet.

According to a possible embodiment, said protuberance is configured so that, in the assembly configuration, it does not interfere with the corresponding seal.

According to a possible embodiment, the protuberance is formed on the eyelet.

According to a possible embodiment, said protuberance is comprised between each upper and lower surface of the eyelet and the corresponding head or base.

According to a possible embodiment, the protuberance, with respect to a radial direction, incident to an axial direction parallel to an axis of the hole, is positioned externally to the respective seal.

According to a possible embodiment, the head of the inlet plug, with respect to a radial direction, incident to an axial direction parallel to an axis of the hole, has radial dimensions such as to abut at least partially with the upper protuberance in the absence of the upper seal.

According to a possible embodiment, the base of the block comprises a flattening suitable to house at least partially the lower seal, said flattening, with respect to a radial direction, incident to an axial direction parallel to an axis of the hole, has radial dimensions such as to not to house the lower protuberance in the absence of the lower seal.

According to a possible embodiment, at least one protuberance is obtained by spot facing or flaring of the corresponding upper or lower surface of the eyelet.

According to a possible embodiment, at least one protuberance is obtained by spot facing or flaring of the corresponding head of the inlet plug or base of the block.

According to a possible embodiment, said spot facing or flaring has a superficial roughness with a circular pattern.

According to a possible embodiment, the inlet plug comprises a radial duct in fluidic communication with the hole of the eyelet and an axial duct, connected to the radial duct and converging in the supply channel.

According to a possible embodiment, the supply channel of the screw nut is threaded and receives in screwing a screw thread made on an outer side wall of the inlet plug.

According to a possible embodiment, the seals are arranged coaxially to the inlet plug.

DESCRIPTION OF THE DRAWINGS

Further features and advantages of the present invention will appear more clearly from the following description of preferred non-limiting embodiments thereof, in which:

FIG. 1b shows a perspective view of detail b in FIG. 1a;

FIG. 2b shows a perspective view of detail b in FIG. 2a;

FIG. 3b shows a perspective view of detail b in FIG. 3a;

FIG. 4b shows a perspective view of detail b in FIG. 4a;

FIG. 5b shows a perspective view of detail b in FIG. 5a;

FIG. 6b shows a perspective view of detail b in FIG. 6a;

FIG. 7b shows a perspective view of detail b in FIG. 7a;

Elements or parts of elements in common to the embodiments described below are referred to with the same reference numerals.

DETAILED DESCRIPTION

Figure 1B:
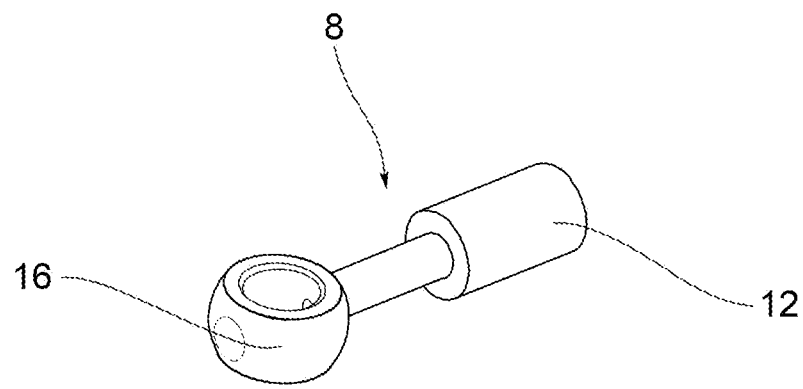
Figure 1A:
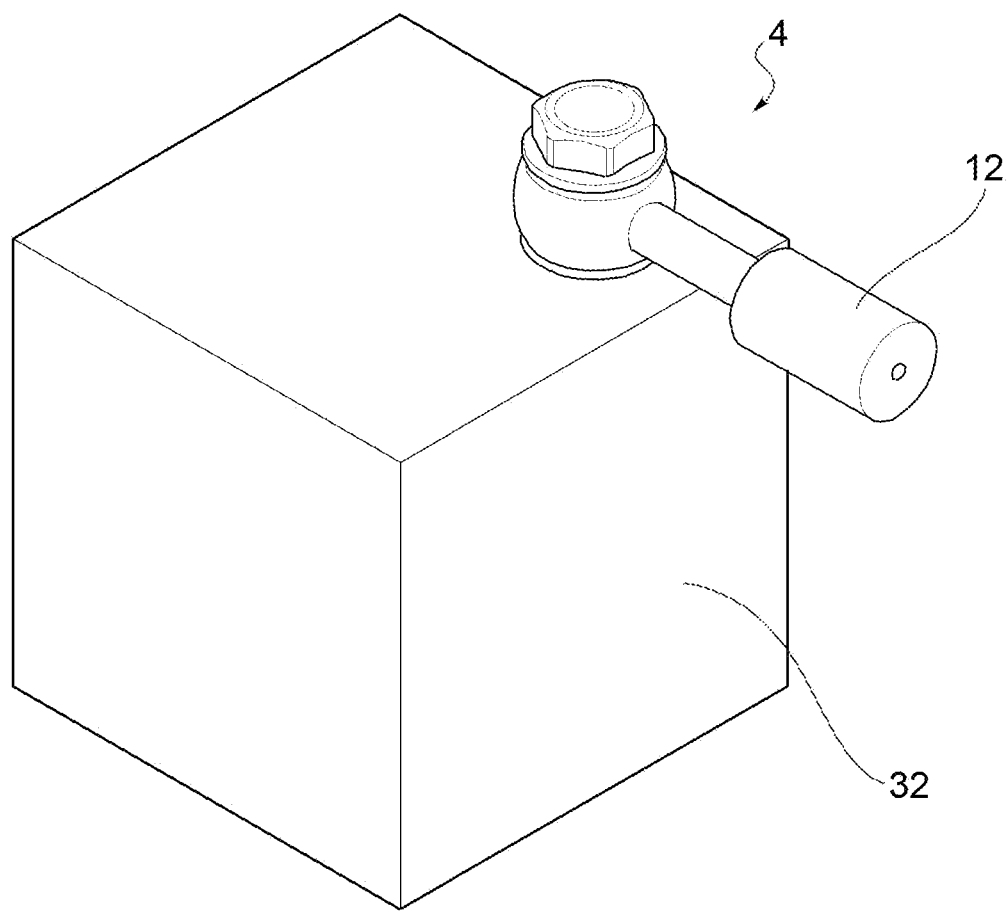
FIG. 1a shows a perspective view of a hydraulic component according to the prior art.
Figure 1C:
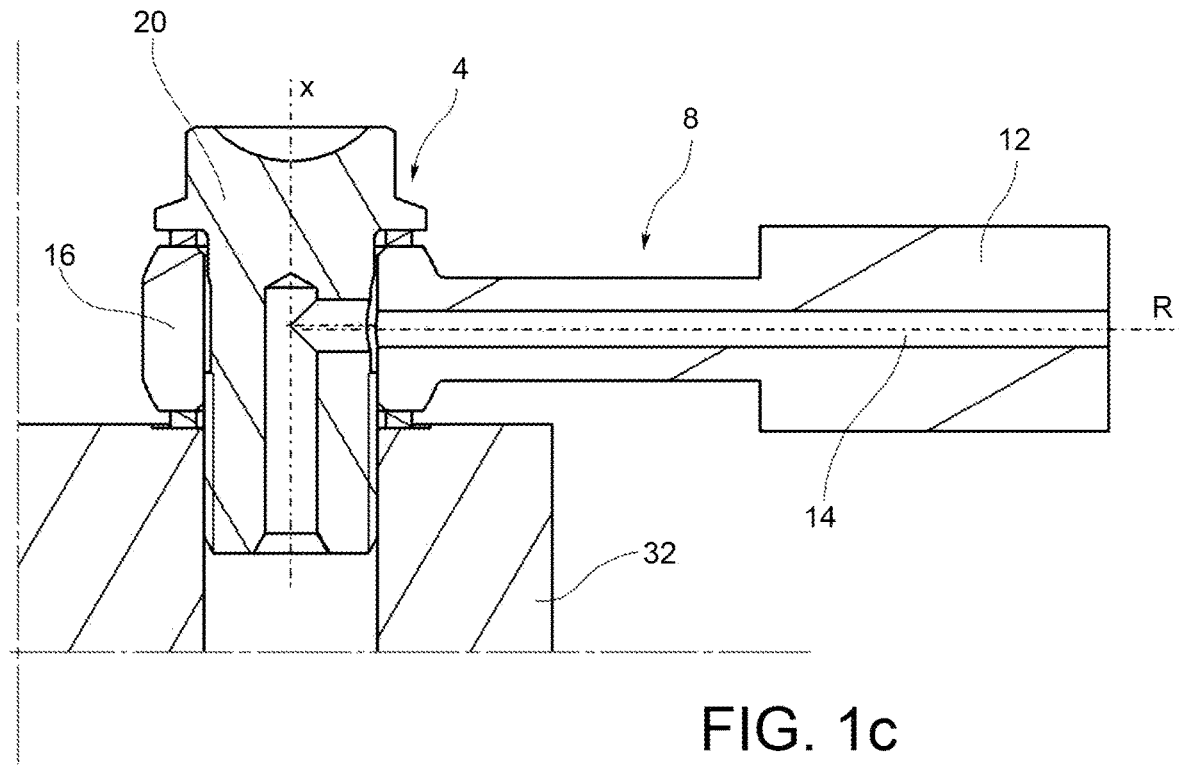
FIG. 1c-1d are sectional views in the assembly configuration of the component in FIG. 1a, in the presence and in the absence of respective seals, respectively.
Figure 1D:
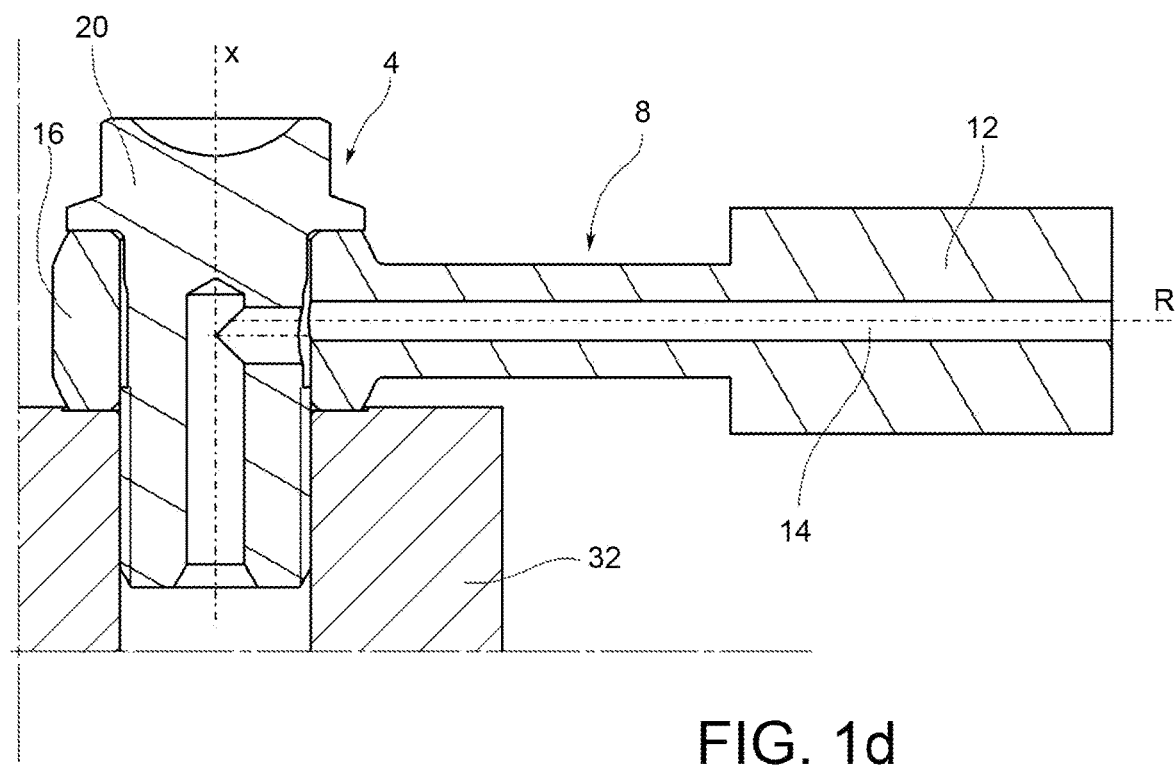

With reference to the above figures, reference numeral 4 indicates as a whole a hydraulic component, in particular for braking and/or clutch drive systems. However, the use of the present invention must be considered in a broad and not restrictive sense, since it is applicable to all connections of hydraulic systems, preferably but not exclusively in the automotive sector, such as brake calipers, pumps, ABS control units, valves and the like.

Said hydraulic component 4 comprises at least one connector 8 fitted with a supply pipe 12, suitable for receiving incoming hydraulic fluid, and an eyelet 16 that sends the fluid in output.

Figure 2B:
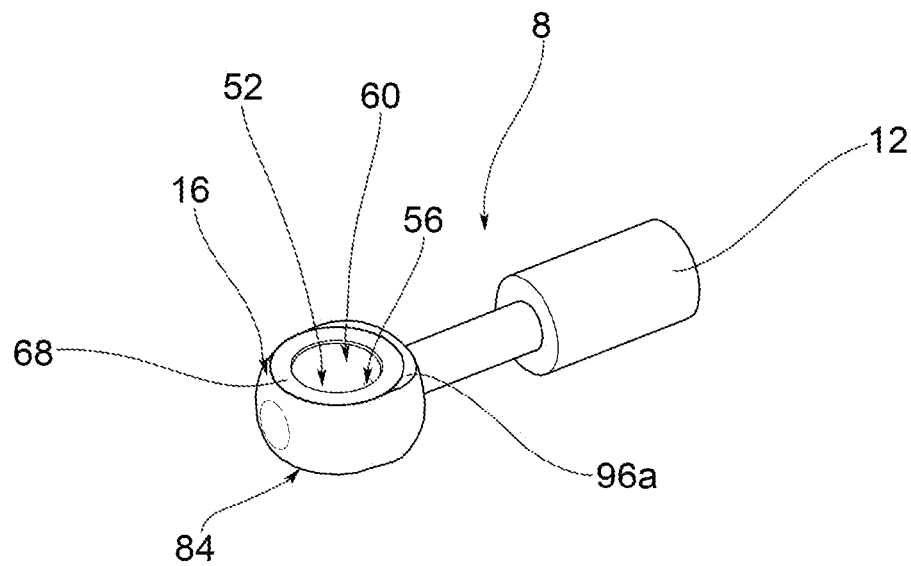
Figure 2A:
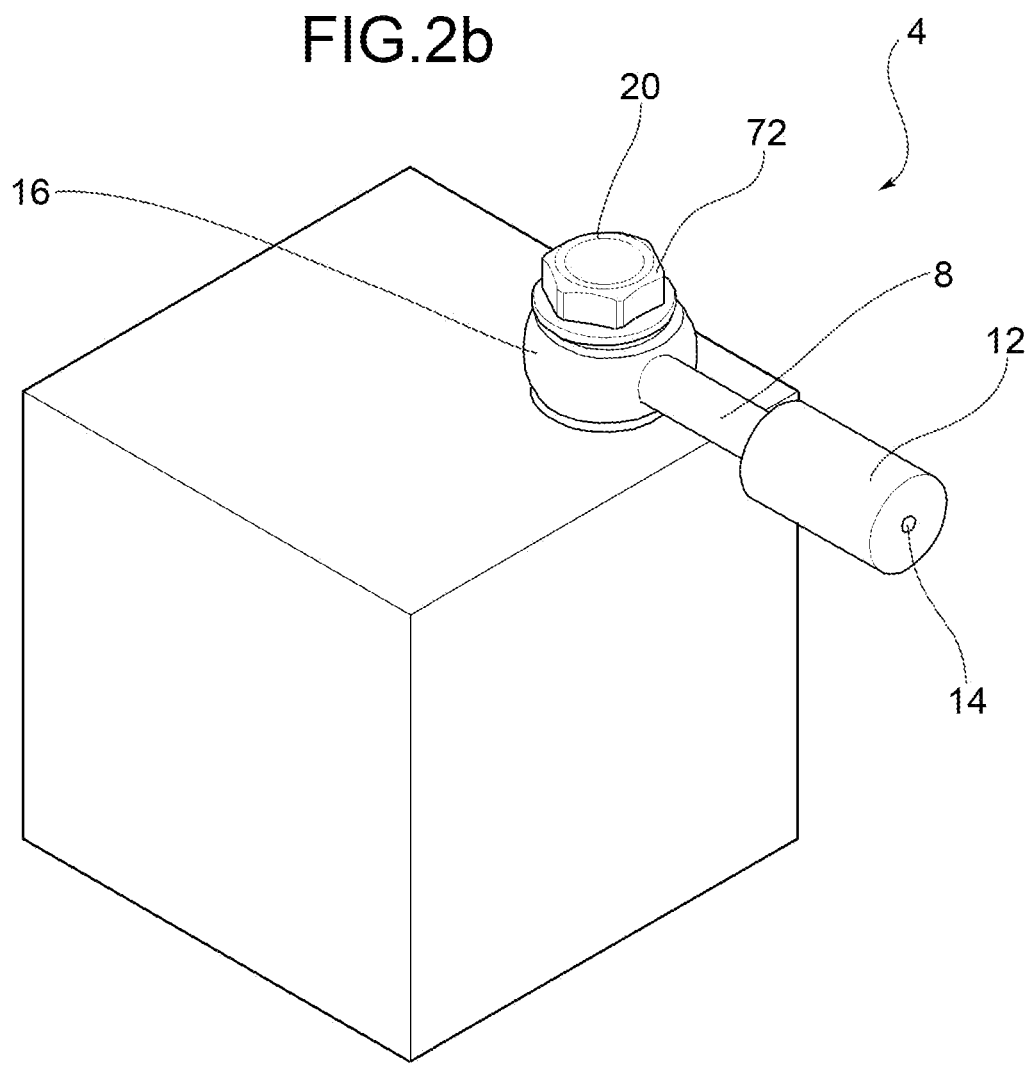
FIG. 2a shows a perspective view of a hydraulic component according to an embodiment of the present invention.
Figure 2C:
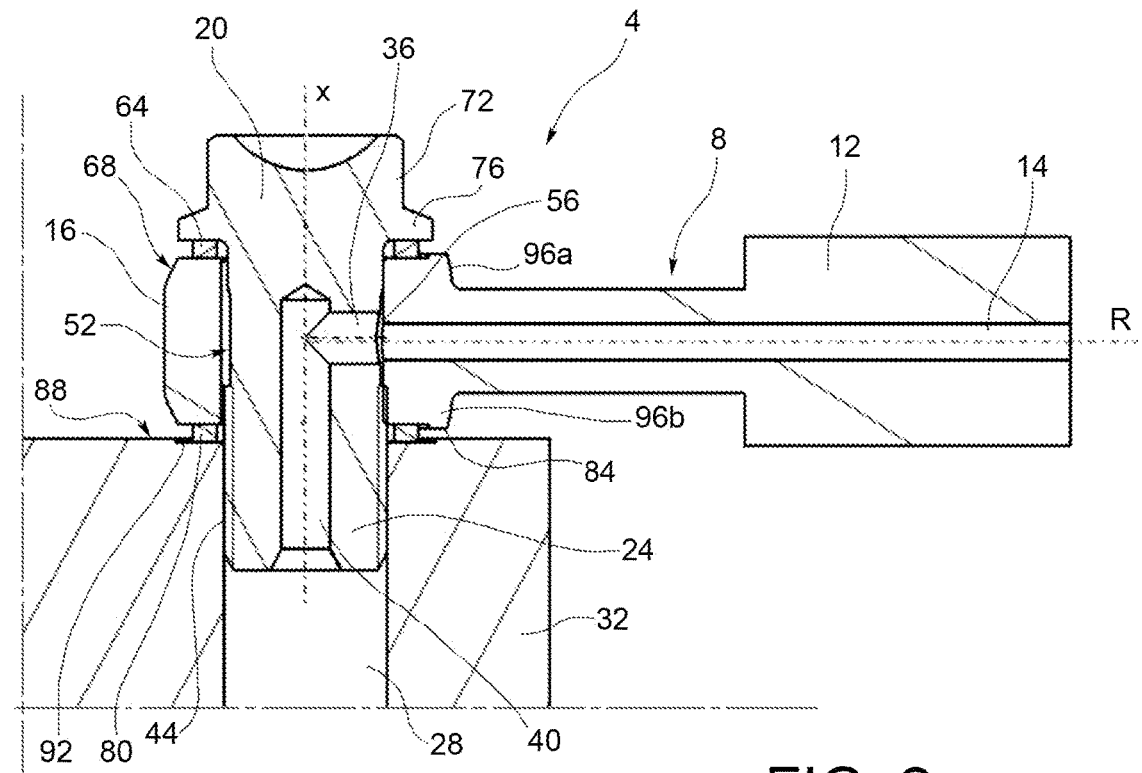
FIGS. 2c-2d show sectional views in the assembly configuration of the component in FIG. 2a, in the presence and in the absence of respective seals, respectively.
Figure 2D:
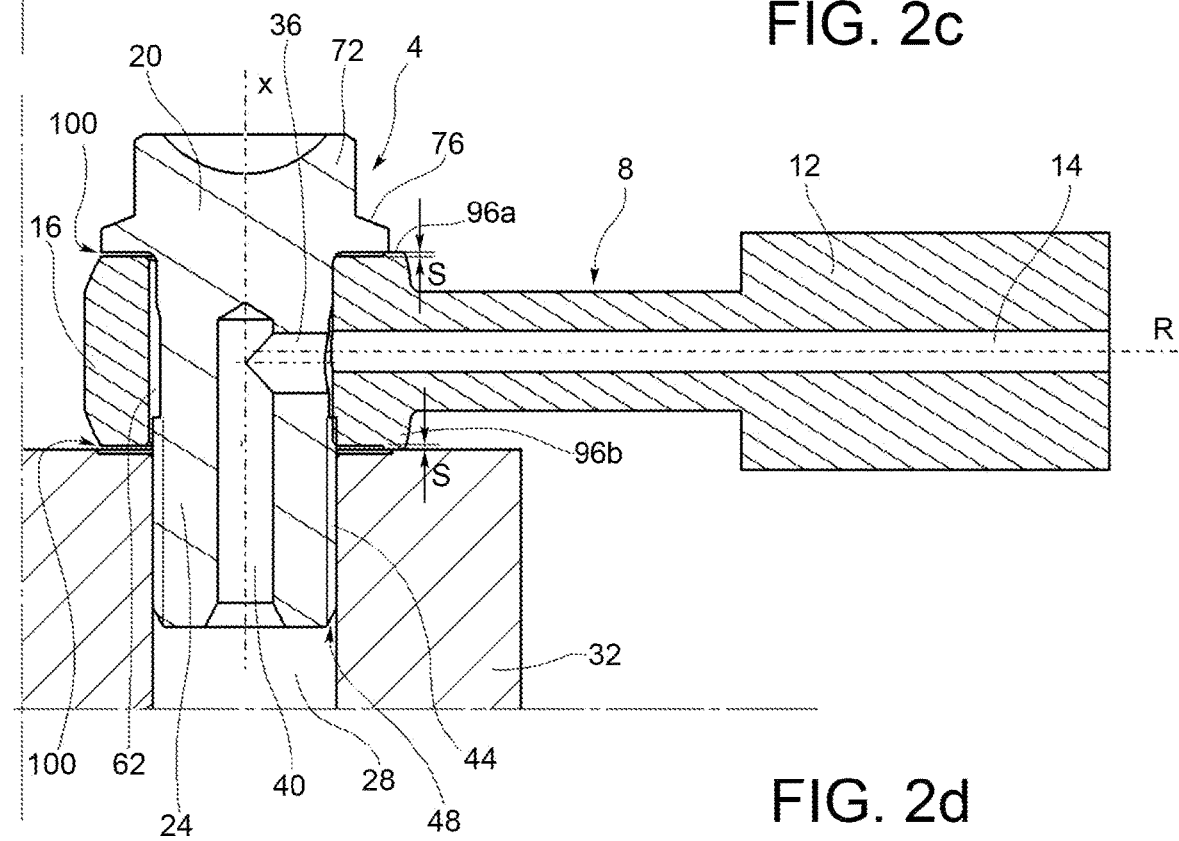
Figure 3B:
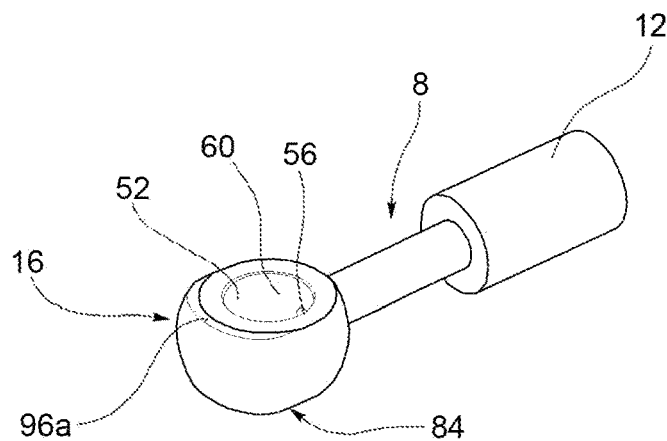
Figure 3A:
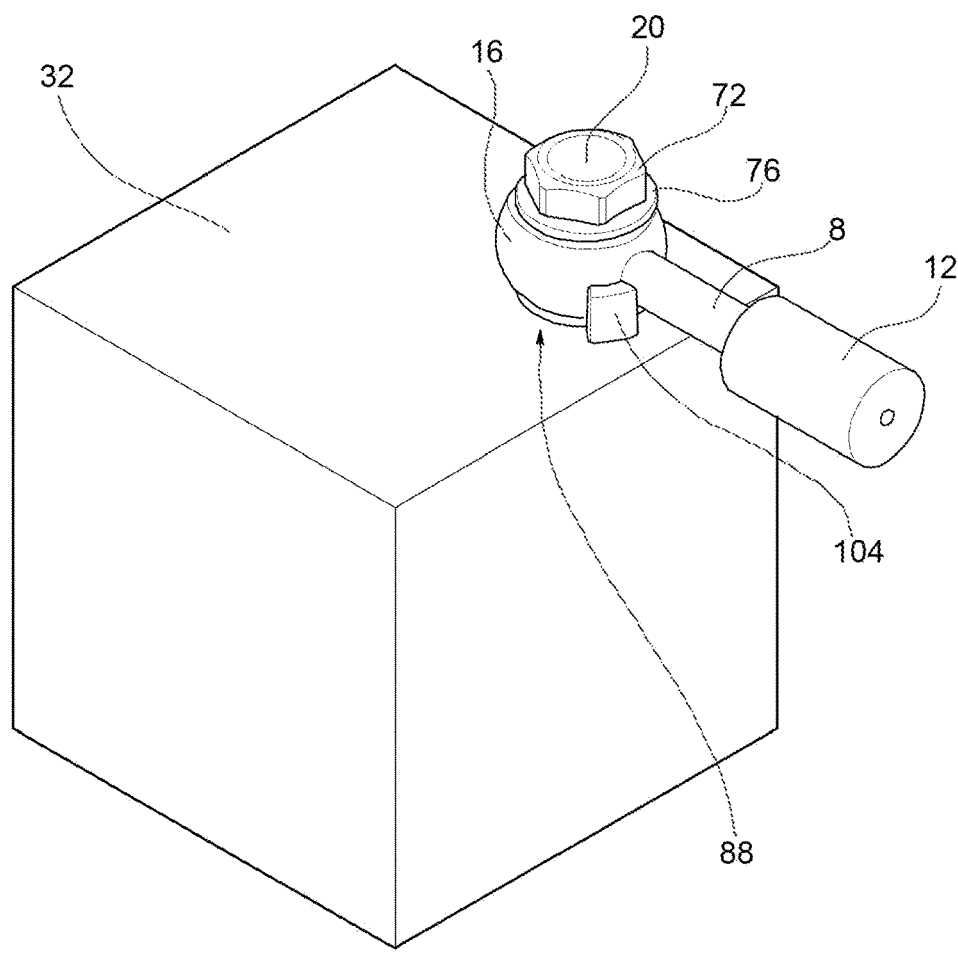
FIG. 3a shows a perspective view of a hydraulic component according to an embodiment of the present invention.
Figure 3C:
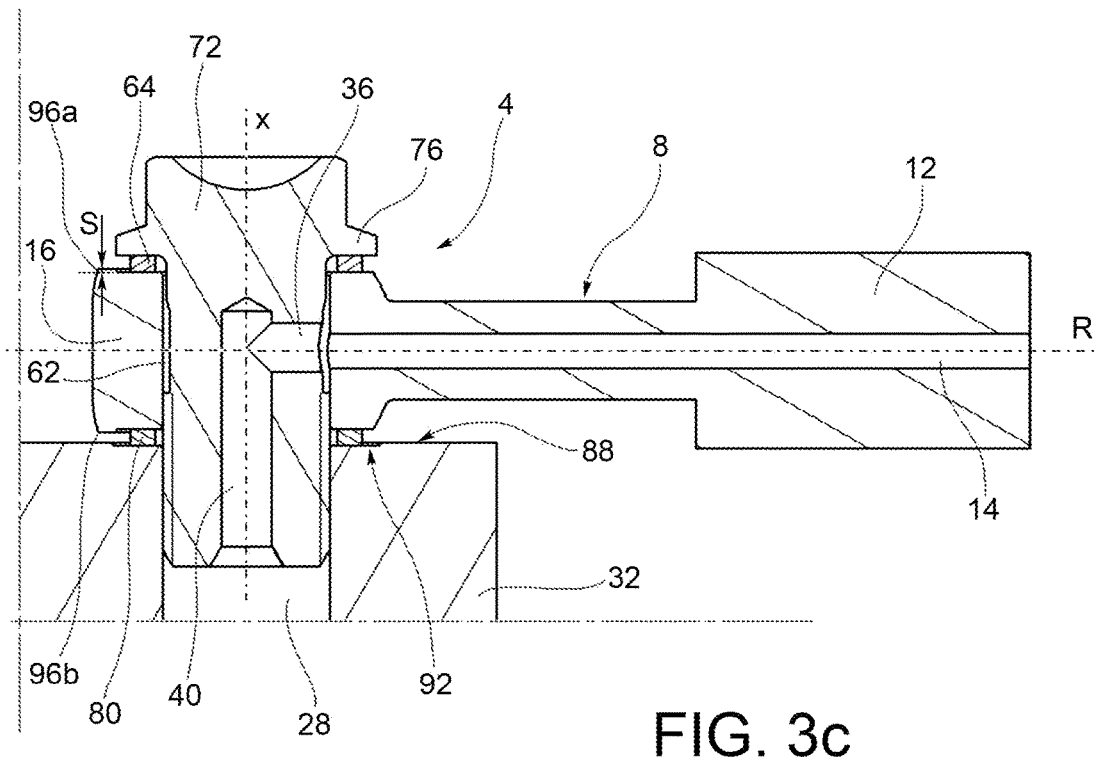
FIGS. 3c-3d show sectional views in the assembly configuration of the component in FIG. 3a, in the presence and in the absence of respective seals, respectively.
Figure 3D:
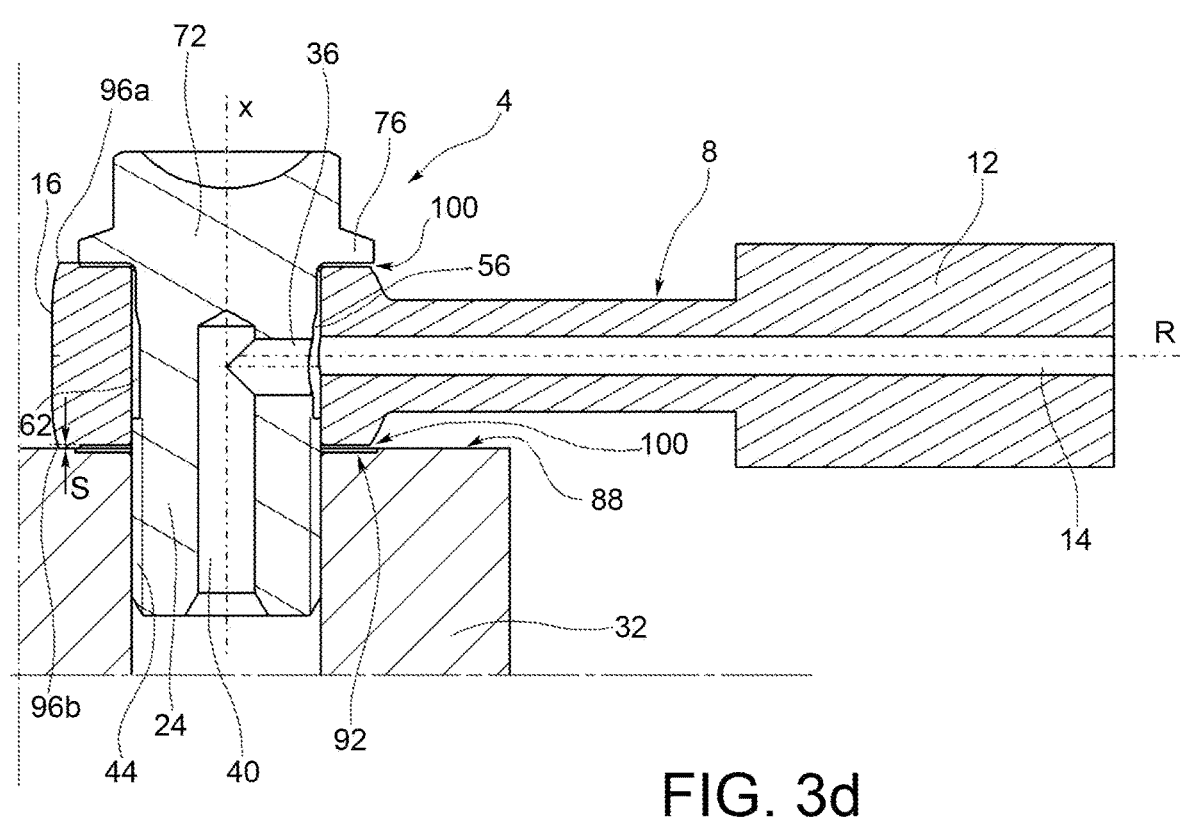
Figure 4B:
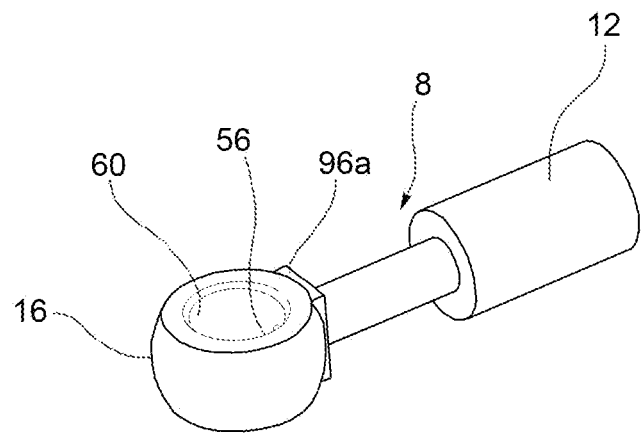
Figure 4A:
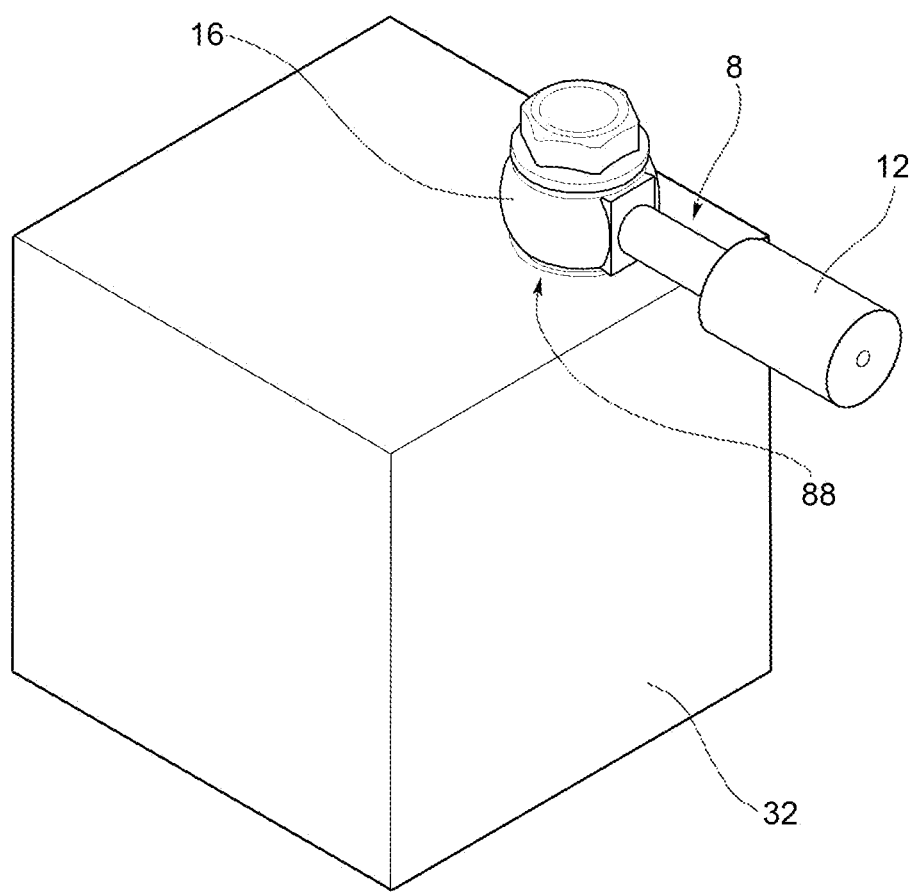
FIG. 4a shows a perspective view of a hydraulic component according to an embodiment of the present invention.
Figure 4C:
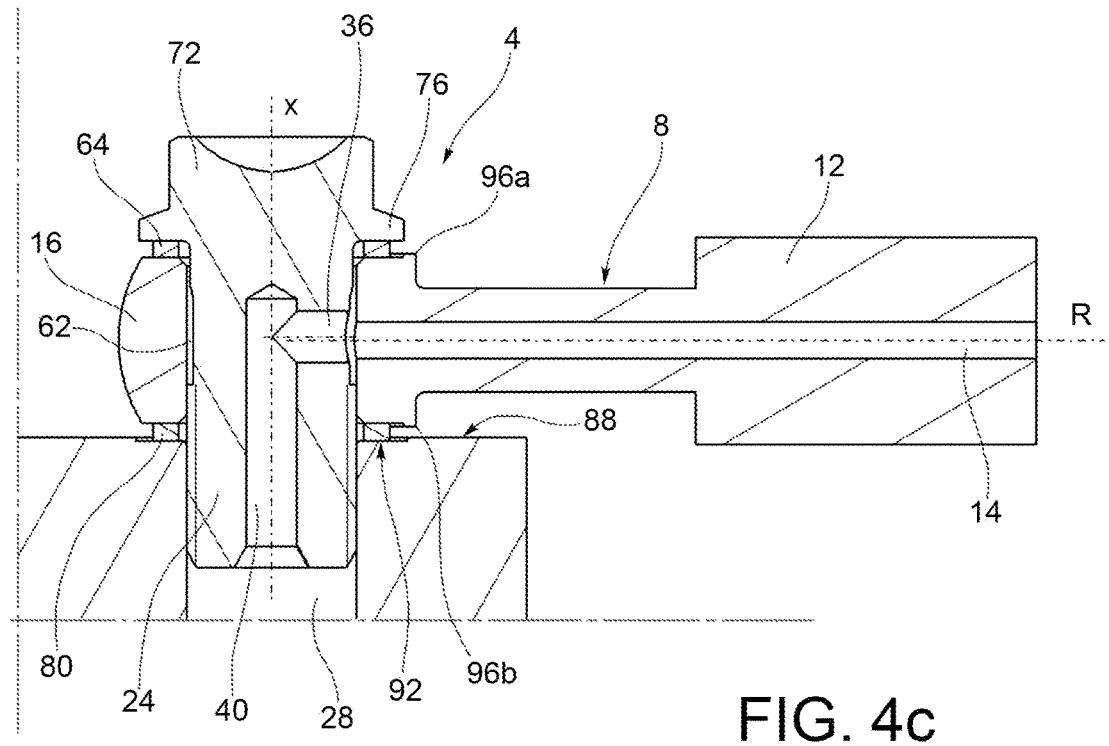
FIGS. 4c-4d show sectional views in the assembly configuration of the component in FIG. 4a, in the presence and in the absence of respective seals, respectively.
Figure 4D:
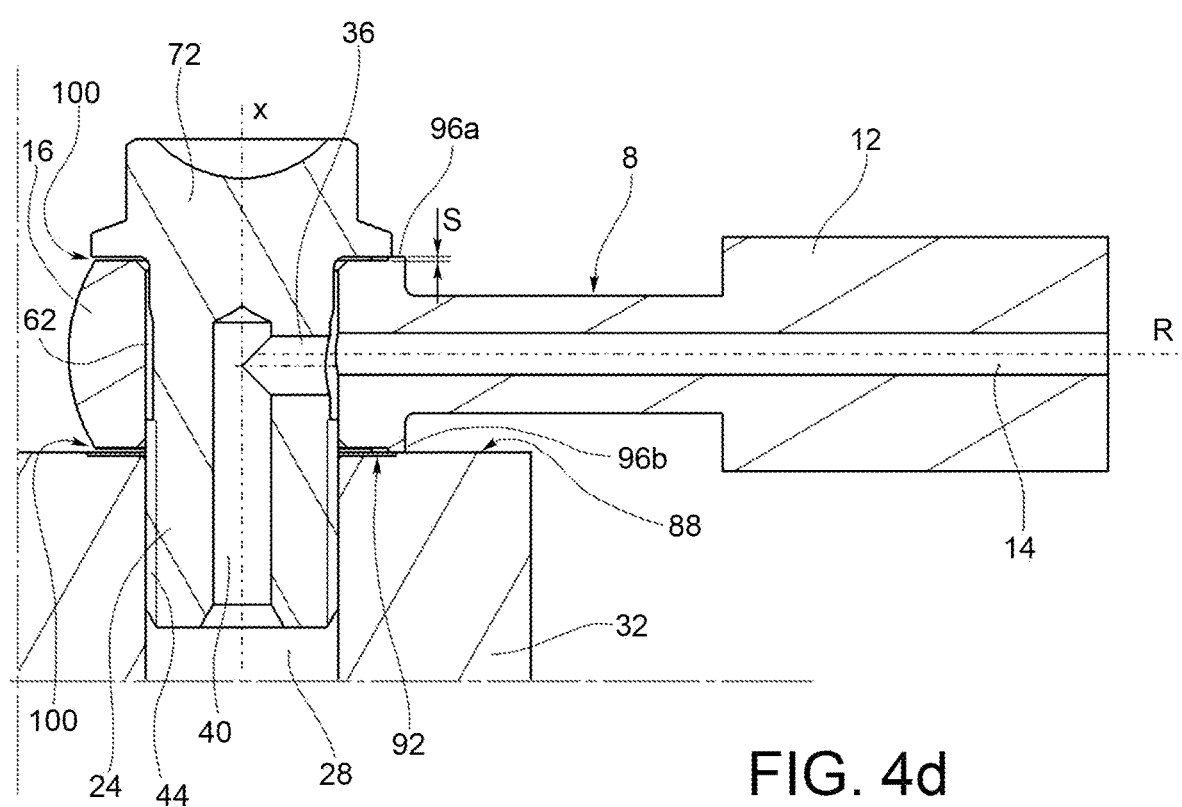
Figure 5B:
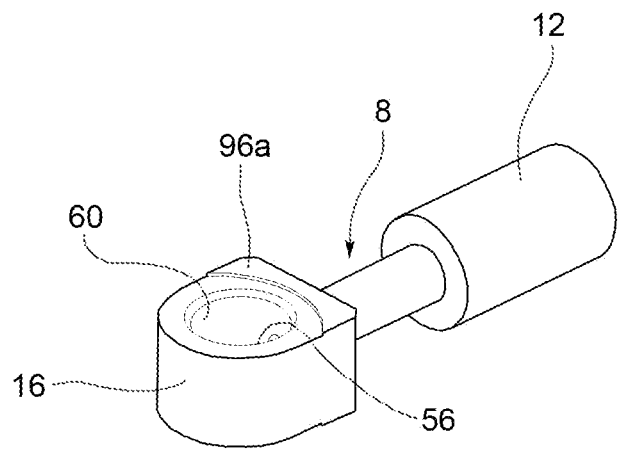
Figure 5A:
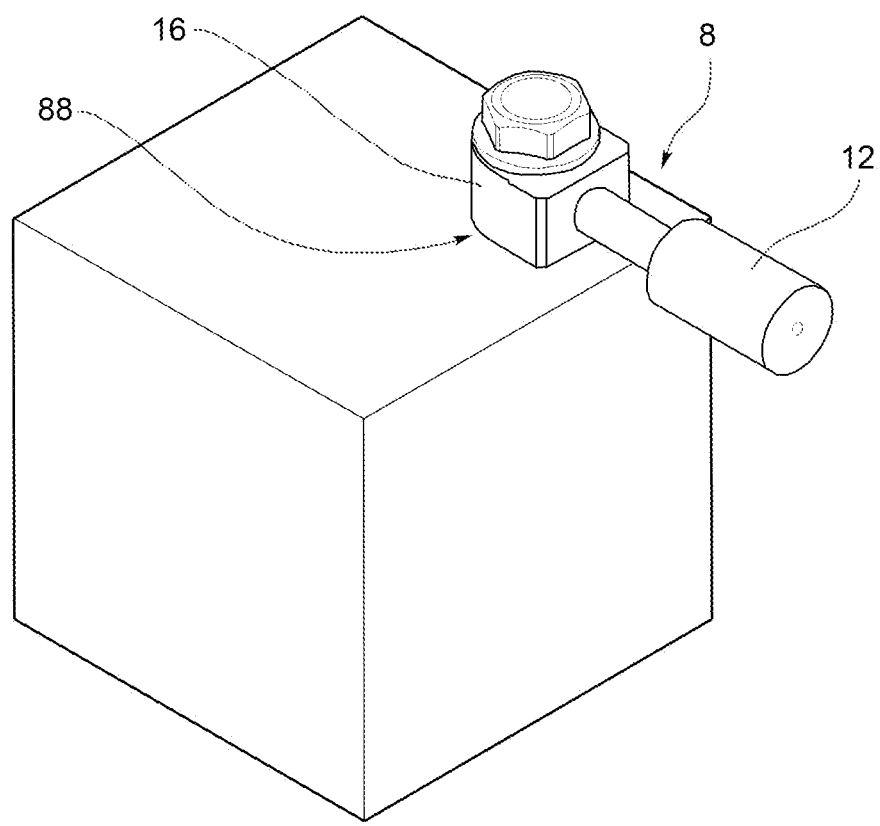
FIG. 5a shows a perspective view of a hydraulic component according to an embodiment of the present invention.
Figure 5C:
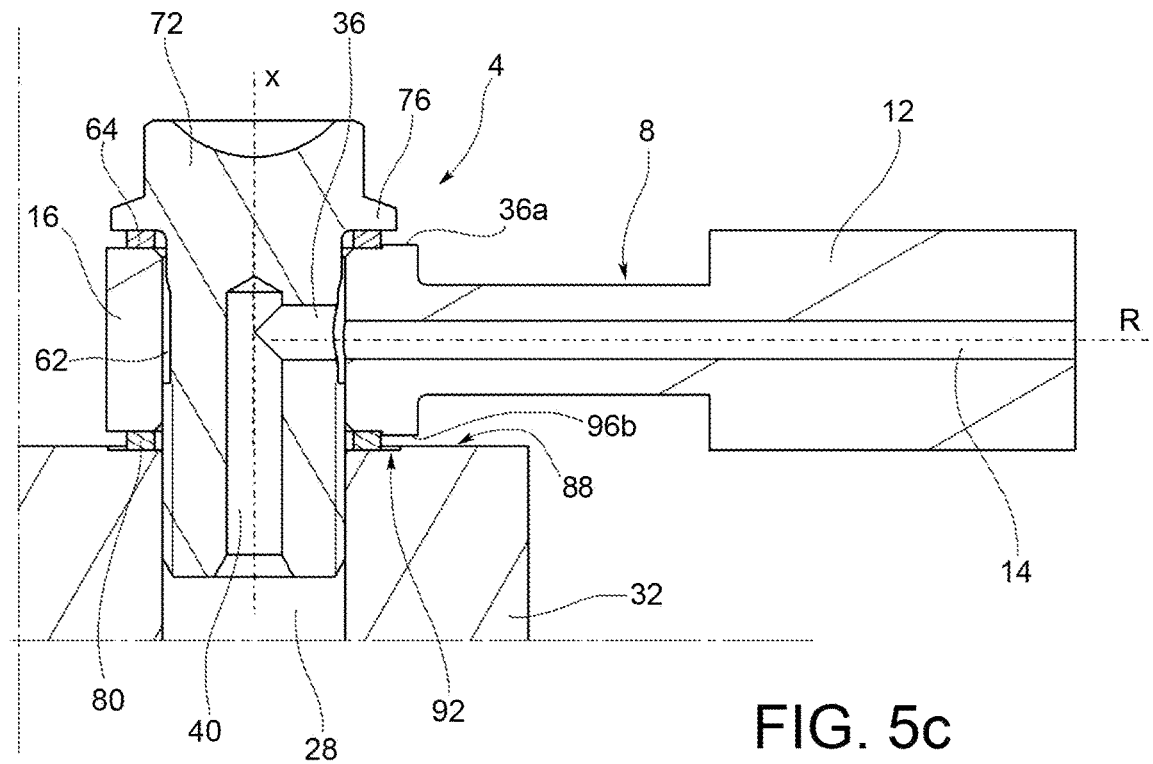
FIGS. 5c-5d show sectional views in the assembly configuration of the component in FIG. 5a, in the presence and in the absence of respective seals, respectively.
Figure 5D:
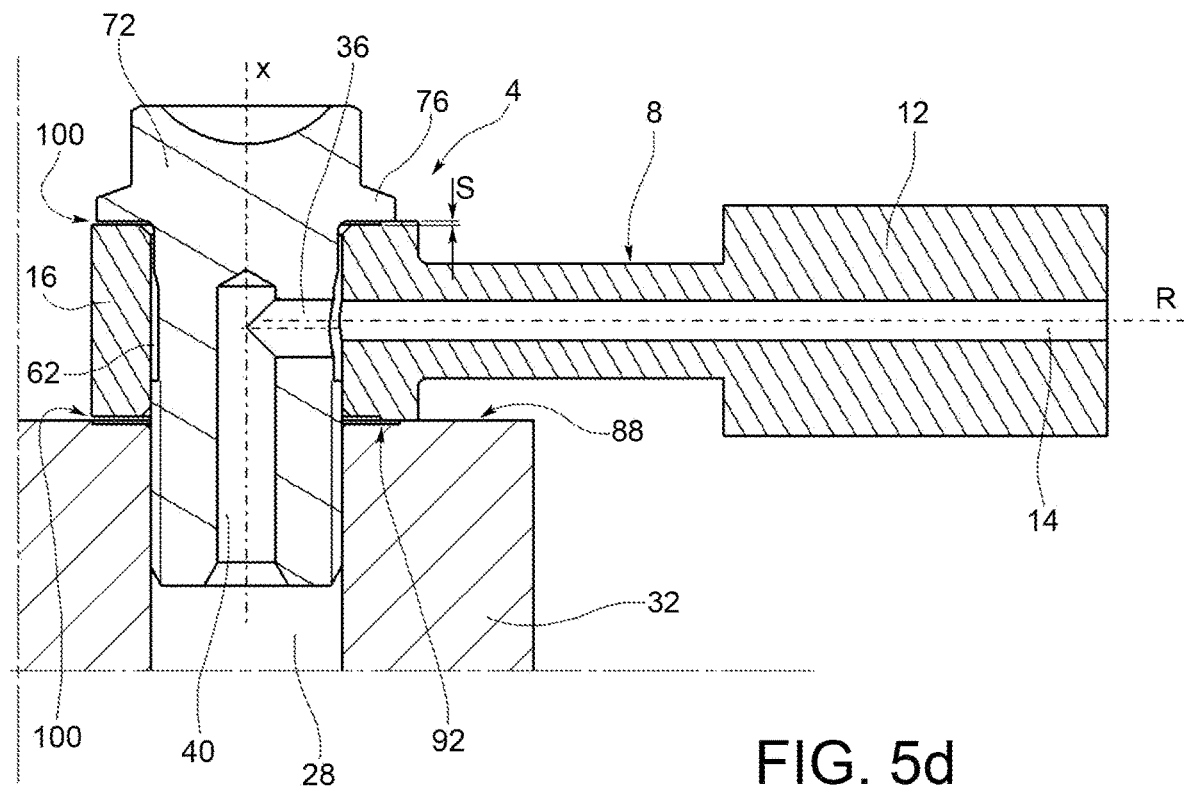
Figure 6B:
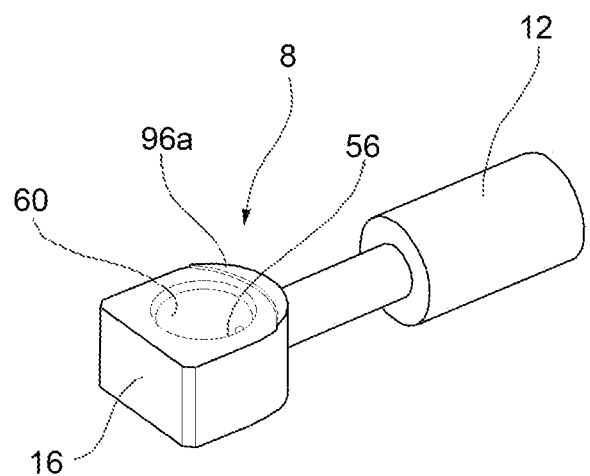
Figure 6A:
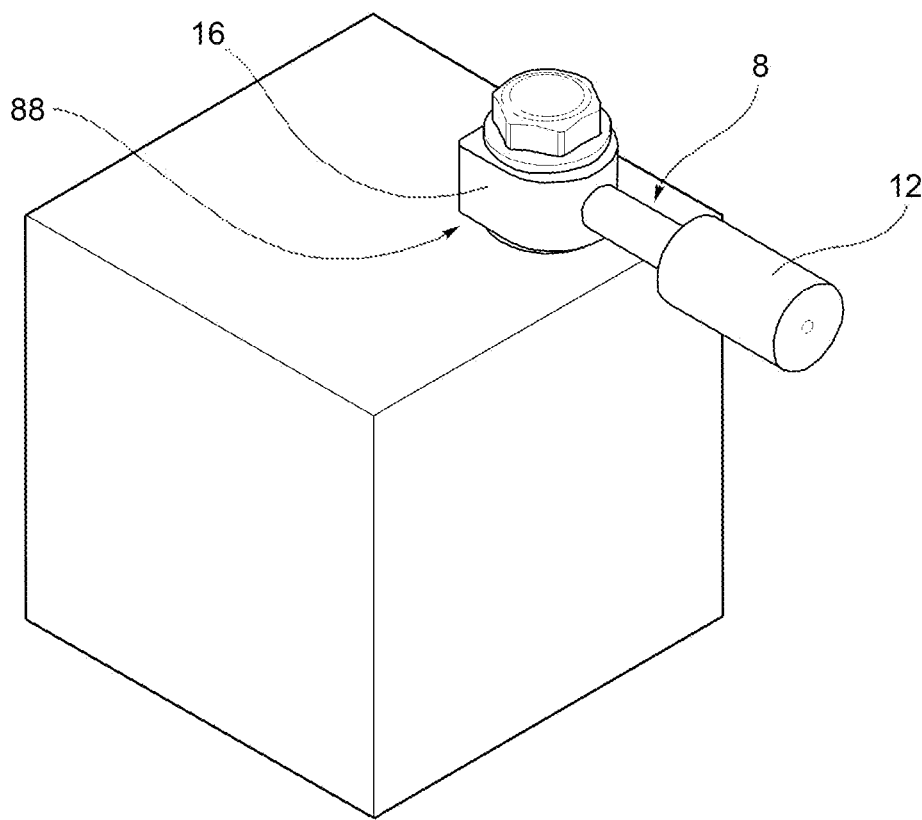
FIG. 6a shows a perspective view of a hydraulic component according to an embodiment of the present invention.
Figure 6C:
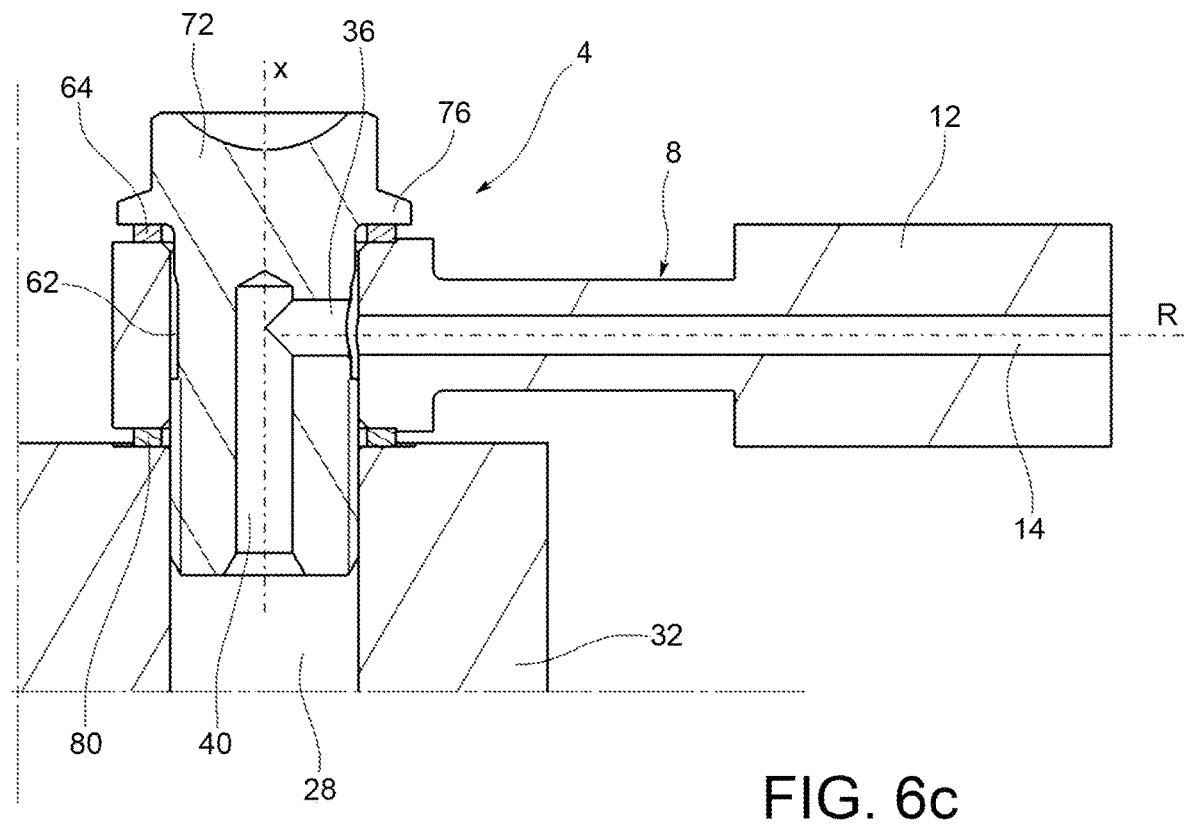
FIGS. 6c-6d show sectional views in the assembly configuration of the component in FIG. 6a, in the presence and in the absence of respective seals, respectively.
Figure 6D:
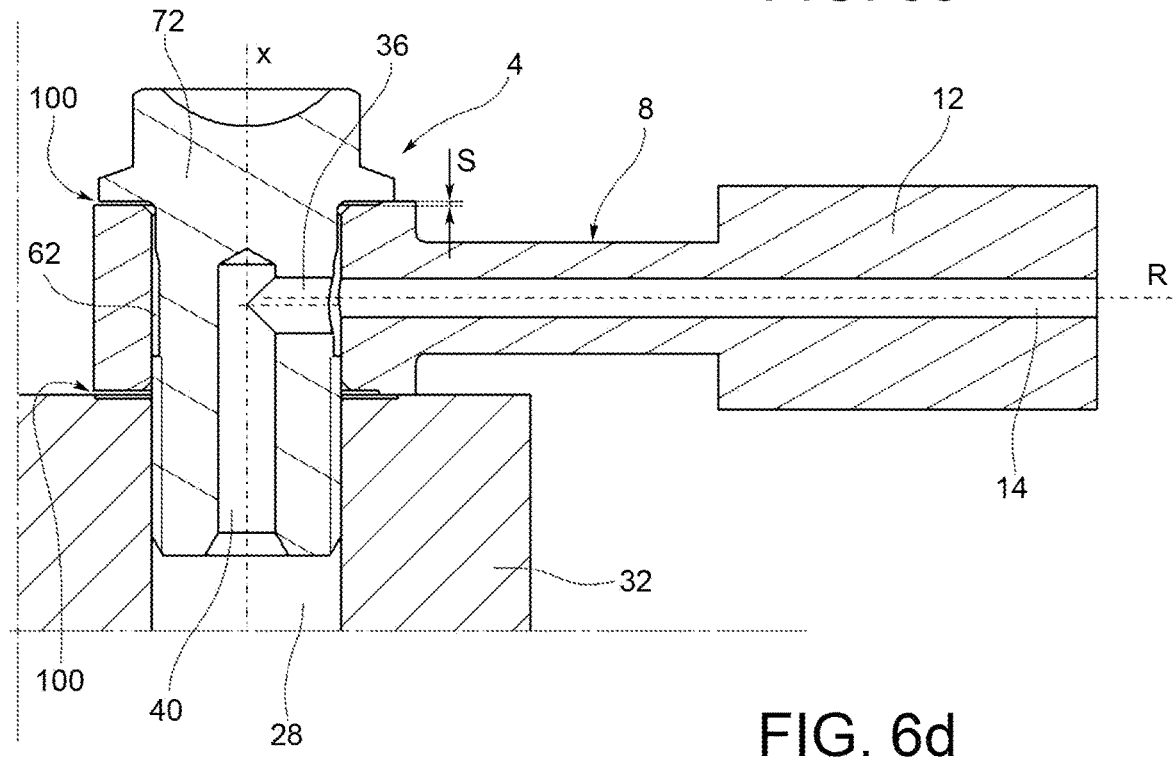
Figure 7B:
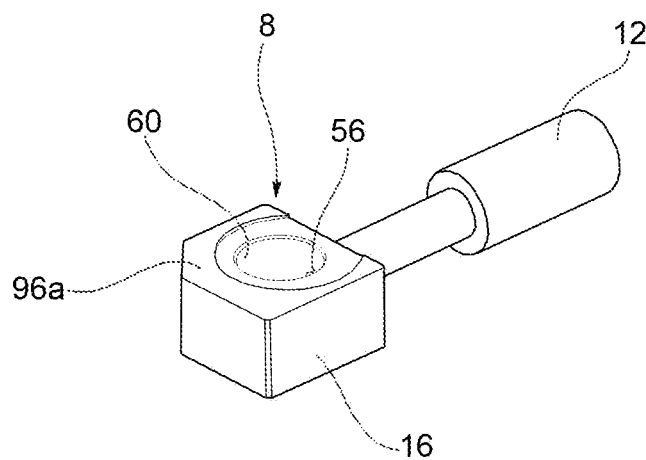
Figure 7A:
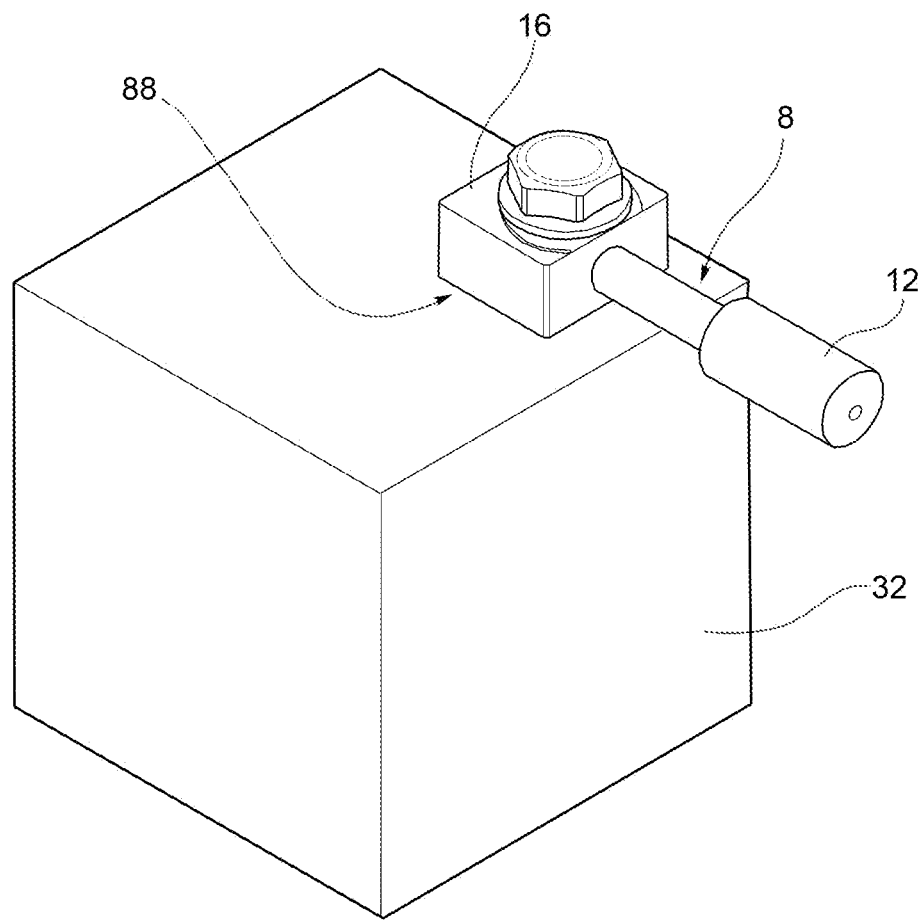
FIG. 7a shows a perspective view of a hydraulic component according to an embodiment of the present invention.
Figure 7C:
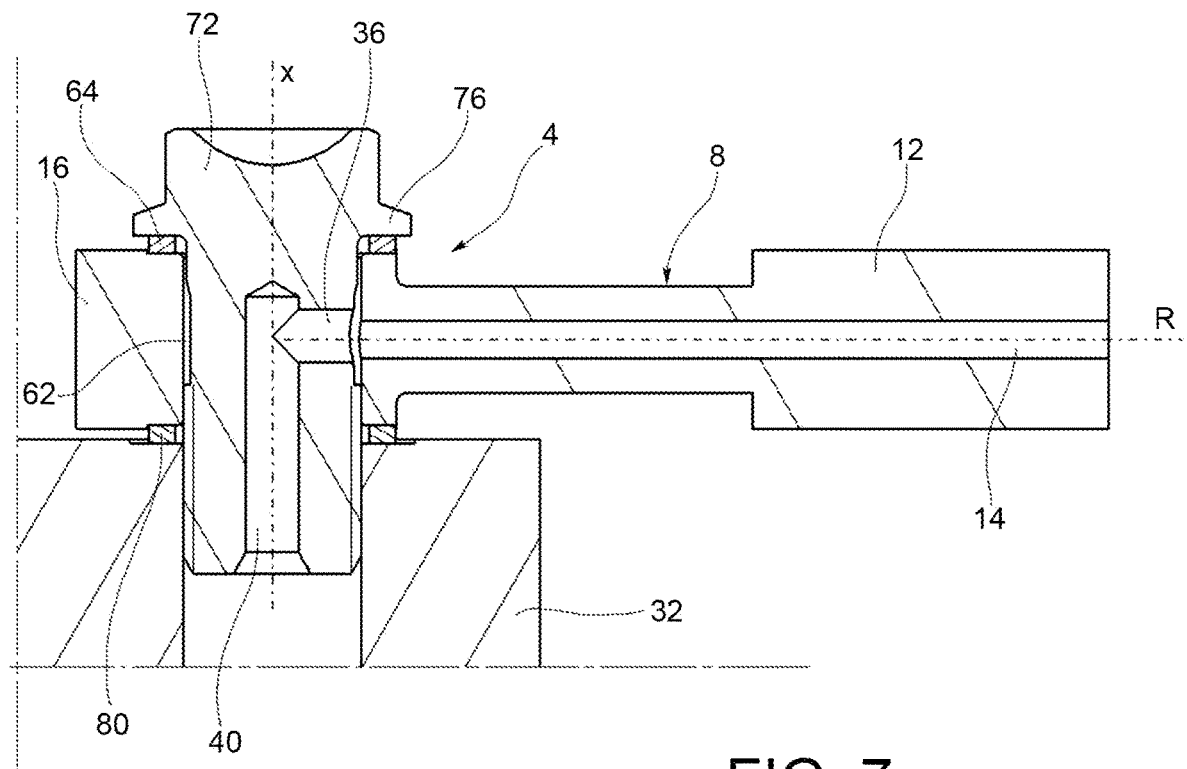
FIGS. 7c-7d show sectional views in the assembly configuration of the component in FIG. 7a, in the presence and in the absence of respective seals, respectively.
Figure 7D:
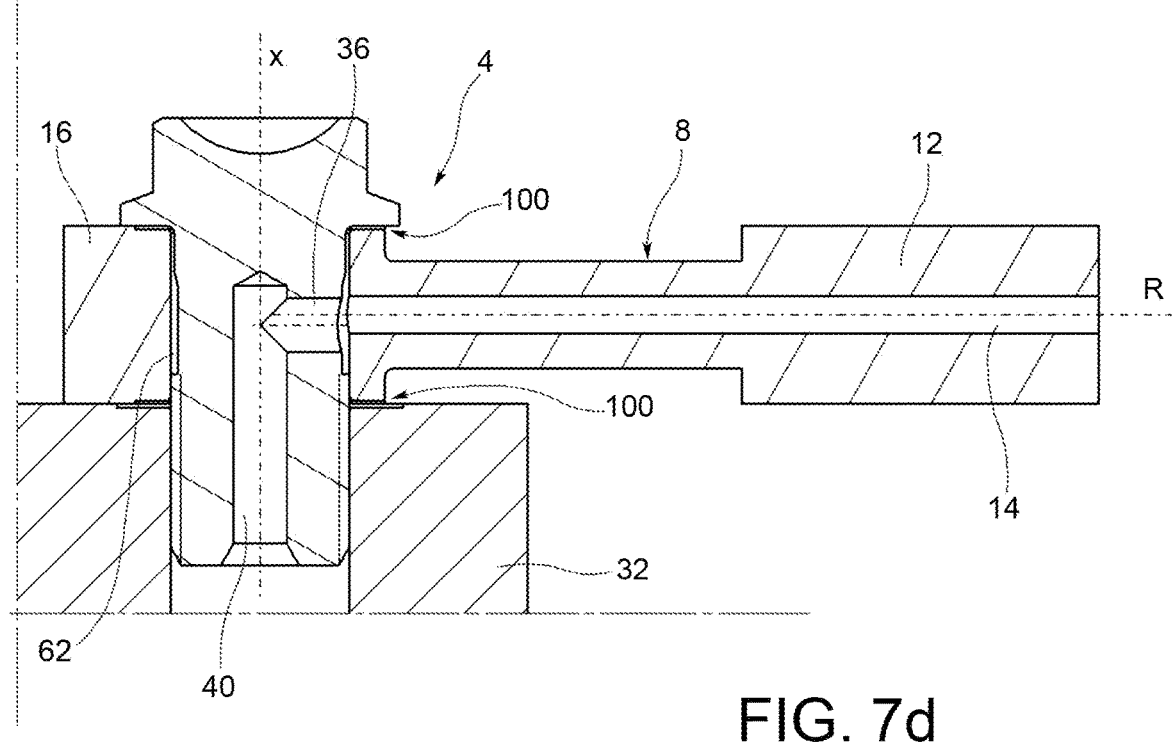
Figure 8A:
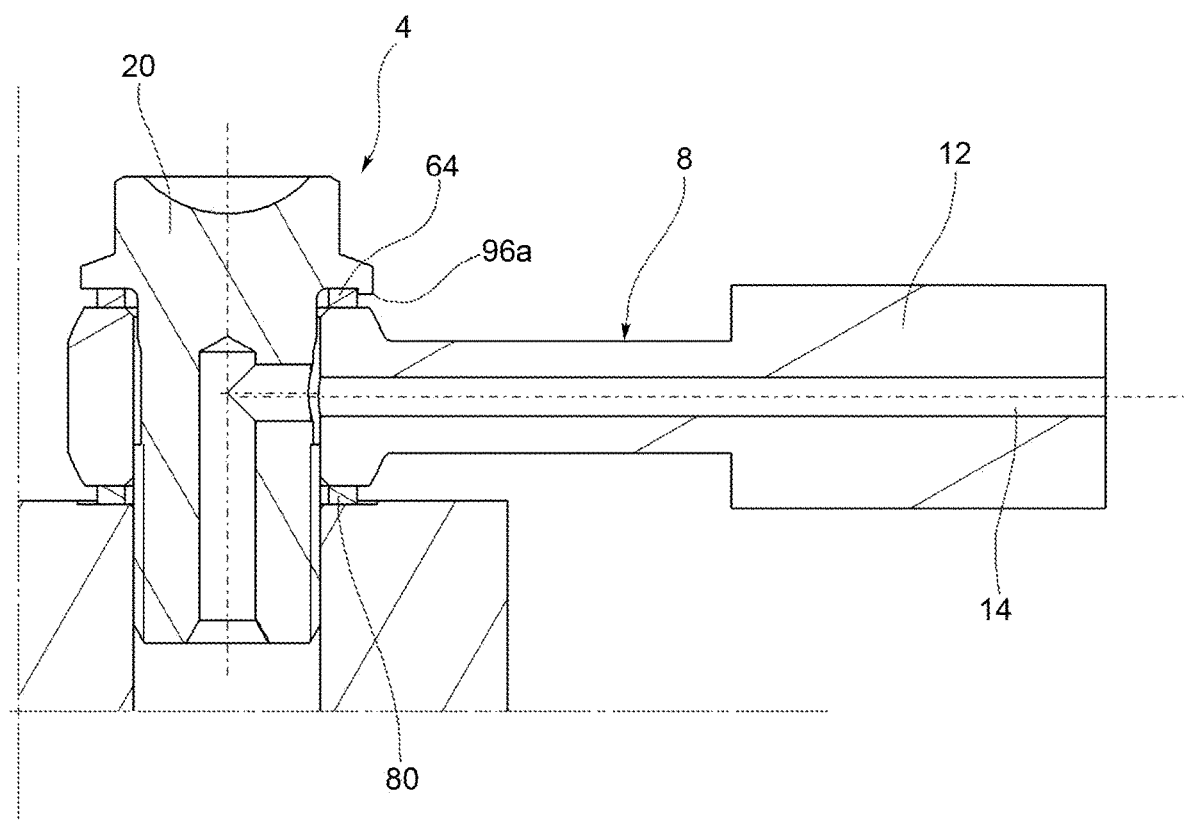
FIG. 8a shows a sectional view of a hydraulic component according to a further embodiment of the present invention, in the presence of respective seals.
Figure 8B:
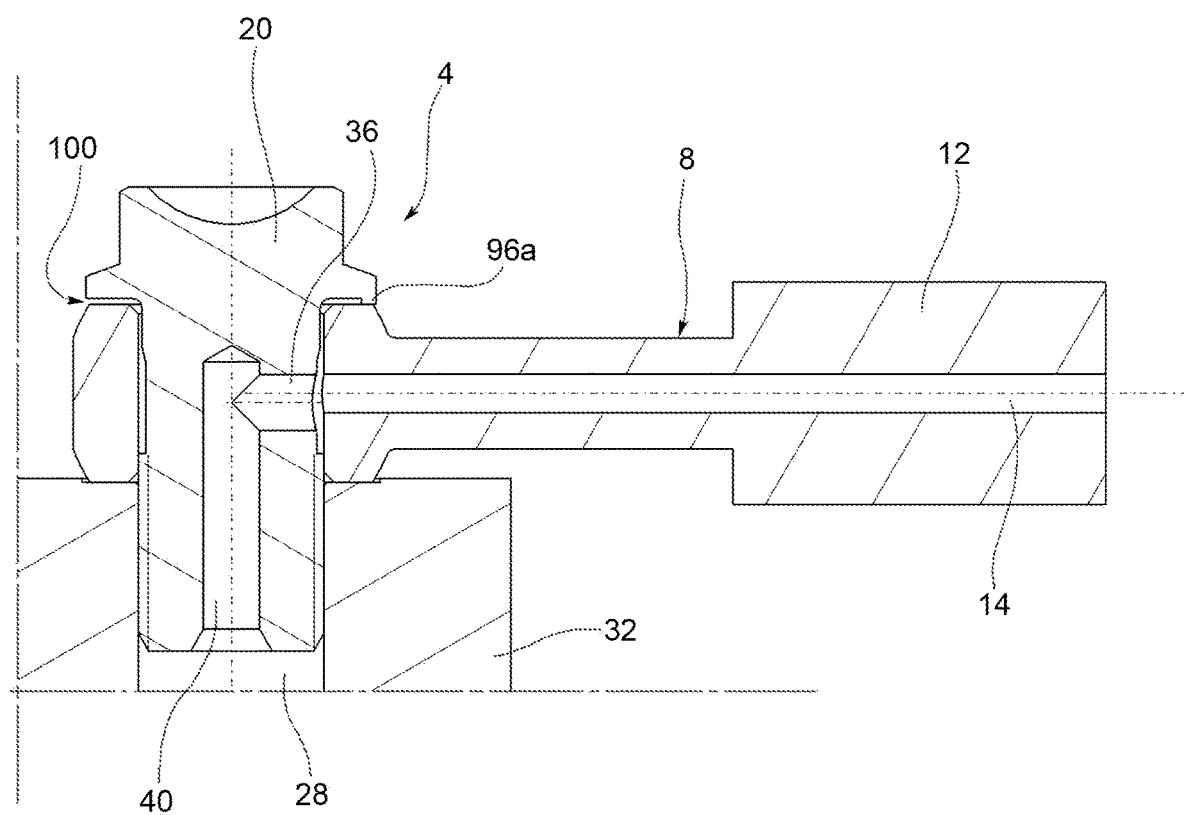
FIG. 8b is shows a sectional view of the hydraulic component in FIG. 8a, in the absence of respective seals.
Figure 9A:
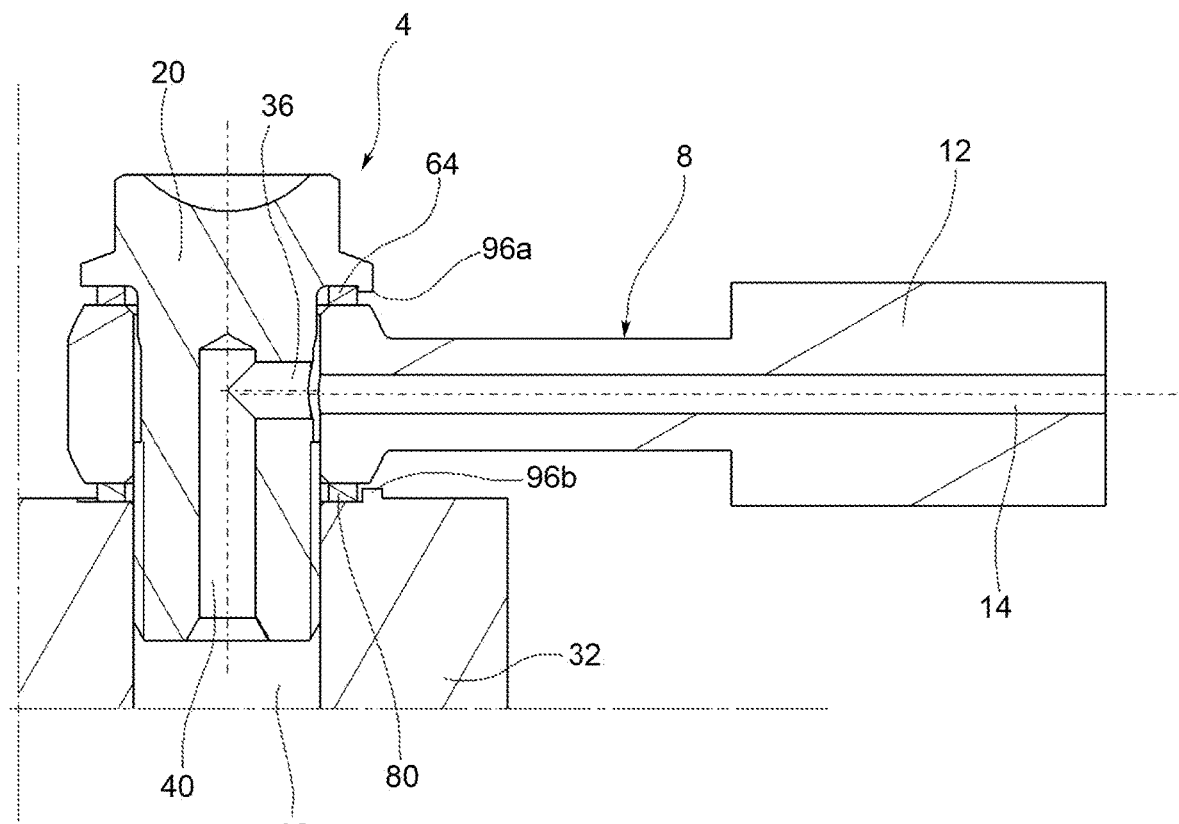
FIG. 9a shows a sectional view of a hydraulic component according to a further embodiment of the present invention, in the presence of respective seals.
Figure 9B:
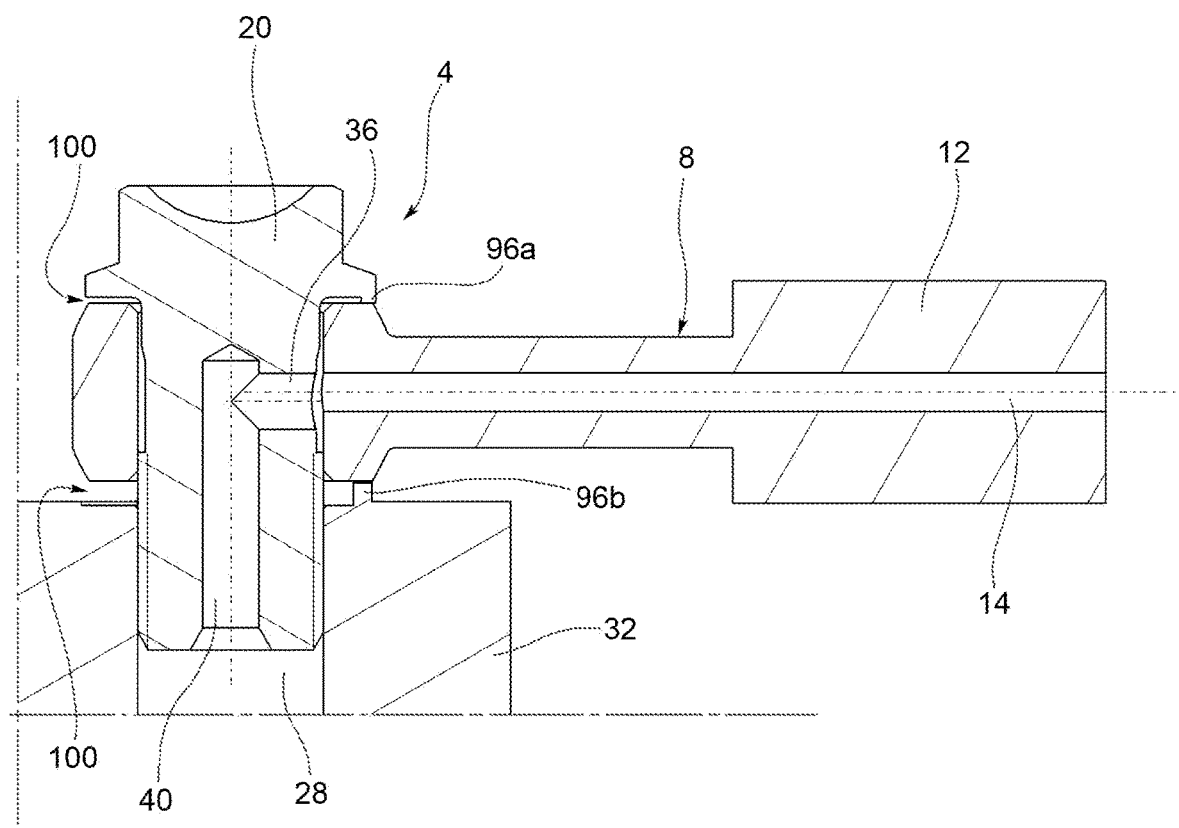
FIG. 9b shows a sectional view of the hydraulic component in FIG. 9a, in the absence of respective seals.
Figure 10:
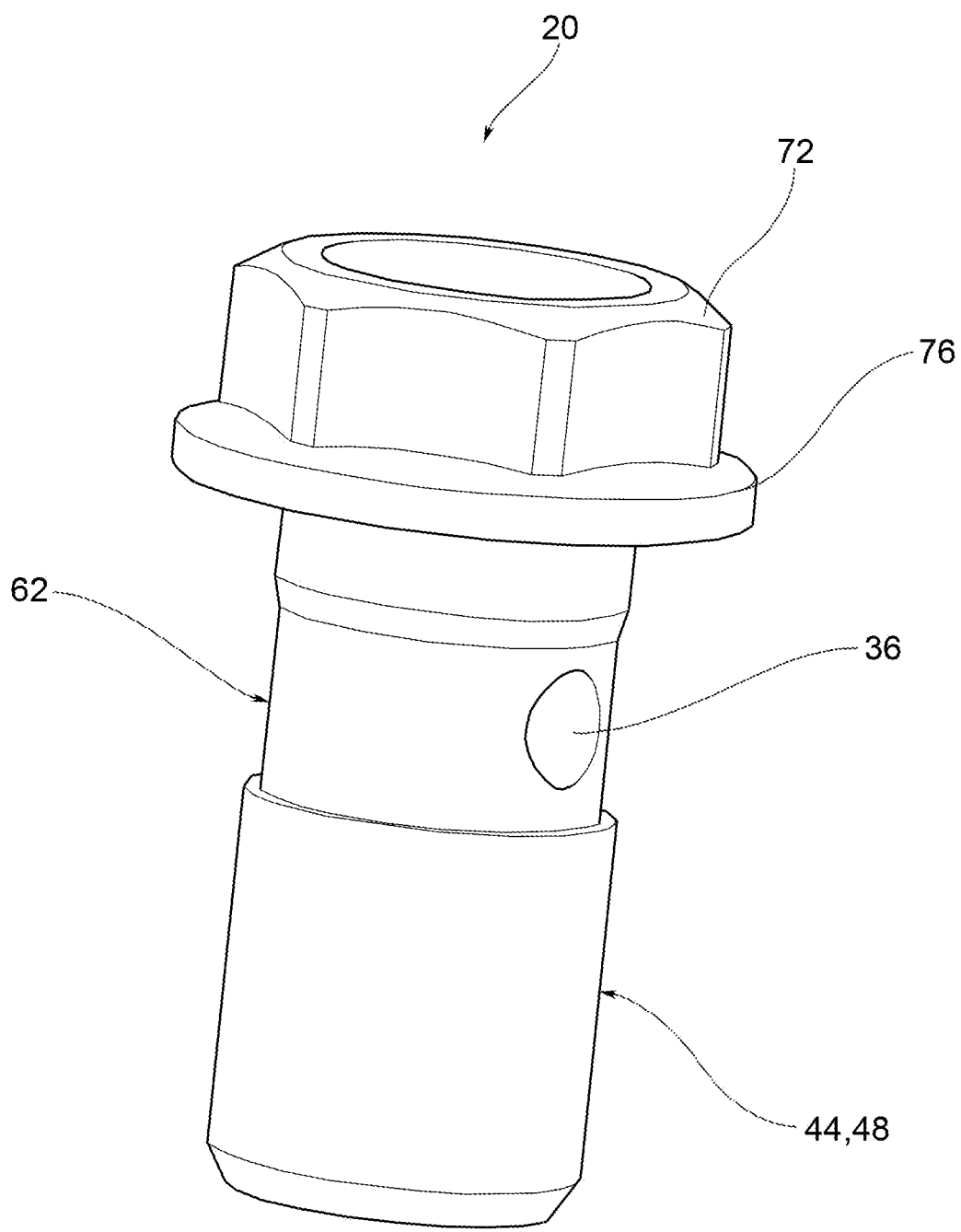
FIG. 10 shows a perspective view of an inlet plug according to the present invention.

The connector 8 can for example be obtained from a semi-finished product, by turning (FIGS. 2a-2d, 3a-3d), by forging (FIGS. 4a-4d, 5a-5d, 6a-6d).

The supply pipe is hollow so as to allow the transport of pressurized fluid through an adduction channel 14 fluidically connected to the eyelet 16.

The hydraulic component further comprises an inlet plug 20 with a hollow cylindrical body 24 that receives the fluid in output from the eyelet 16 and brings it into a supply channel 28 made on a block or nut screw 32.

For example, the inlet plug 20 comprises a radial duct 36 in fluidic communication with the adduction channel 14 of the eyelet 16 and an axial duct 40, connected to the radial duct 36 and converging in the supply channel 28.

For example, the supply channel 28 of the screw nut 32 is threaded and receives in screwing a screw thread 44 made on an outer side wall 48 of the inlet plug 20.

Preferably, the inlet plug 20 is inserted coaxially to a hole 52 delimited by the eyelet 16; in other words, the hole 52 is formed in the eyelet.

According to an embodiment, the inner channel 14 of the eyelet 16 opens onto an opening 56 of an inner lateral wall 60 of the eyelet 16 facing the radial duct 36 of the inlet plug 20 in order to allow the fluid connection between the inlet pipe 12 and the supply channel 28 of the nut screw 32.

For example, the inner channel 14 of the eyelet 16 opens at a circular crown 62 formed on the outer lateral wall 48 of the inlet plug 20.

It should be noted that there is no need for the radial duct 36 of the inlet plug 20 and the opening 56 of the eyelet 16 to be aligned as shown for example in the figures: in fact, the inlet plug 20 is screwed into the nut screw 32, therefore the position of its hydraulic connection opening 56 will be random with respect to the section plane once screwed. The hydraulic connection is ensured by the fluid which creeps into the circular crown 62 formed on the outer lateral wall 48 of the inlet plug 20 forming a recess over the whole diameter of the shank of the same inlet plug.

The hydraulic component 4 comprises at least one upper seal 64 interposed between an upper surface 68 of the eyelet 16 and a head 72 of the inlet plug 20.

The head 72 of the inlet plug 20 is opposite to the thread 44, does not penetrate inside the supply channel 28 and is provided with a profile, for example hexagonal, suitable for facilitating screwing of the inlet plug 20.

The head 72 comprises at least one collar 76 which forms an undercut with respect to the eyelet 16, abutting against the upper surface 68 of the eyelet 16.

The upper seal 68 is typically a ring, for example of annealed copper, fitted coaxially to the inlet plug 20.

In assembly configuration, said upper seal 64 is axially compressed between the upper surface 68 of the eyelet 16 and the collar 76 of the head 72 of the inlet plug 20.

The hydraulic component 4 further comprises at least one lower seal 80 interposed between a lower surface 84 of the eyelet 16 and a base 88 of the block 32.

The base 88 of the block 32 comprises a flattening 92 adapted to house at least partially the lower seal 80.

The lower seal 80 is typically a ring, for example of annealed copper, fitted coaxially to the inlet plug 20.

In assembly configuration, said lower seal 80 is axially compressed between the lower surface 84 of the eyelet 16 and the flattening 92 on the base 88 of the block 32.

Advantageously, between at least one of said upper and lower surfaces 68, 84 of the eyelet 16 and the corresponding head 72 or base 88 is interposed a protuberance 96, respectively upper 96a or lower 96b.

By axial it is meant a thickness parallel to a direction coaxial to the eyelet 16 and/or to the supply channel 28.

In other words, the upper protuberance 96a, if present, is interposed between the upper surface 68 of the eyelet 16 and the head 72 (or rather the collar 76); the lower protuberance 96b, if present, is interposed between the lower surface 84 of the eyelet 16 and the base 88 (or rather the flattening 92).

As said, the upper 96a and lower 96b protuberances may be present both individually and simultaneously, according to different embodiments of the present invention.

Said protuberance 96 is sized or configured in such a way that, in the absence of the corresponding upper 64 or lower 68 seal, the protuberance 96 abuts and creates an interspace 100 between said upper 68 and bottom 84 surfaces of the eyelet 16 and the corresponding head 72 or base 88, allowing fluid leakage.

For example, in the case in which the protuberance 96 is interposed between the upper surface 68 of the eyelet 16 and the head 72, in the absence of the upper seal 64, the protuberance abuts against the upper surface of the eyelet 16 and head 72 in such a way as to create at least one interspace 100 therebetween; said interspace 100 then extends into the portion adjacent to the protuberance 96 itself and/or in a position diametrically opposite thereto.

In the case in which the protuberance 96 is interposed between the lower surface 84 of the eyelet 16 and the base 88, in the absence of the lower seal 64, the protuberance 96 abuts against the lower surface 84 of the eyelet 16 and the base 88 so as to create at least one interspace 100 therebetween; said interspace 100 extends in the portion adjacent to the protuberance 96 itself and/or in a position diametrically opposite thereto.

Said protuberance 96 is configured in such a way that in the assembled configuration, it does not interfere with the corresponding upper 64 or lower 80 seal.

For example, this condition is obtained since, according to an embodiment, said lower 96b or upper 96a protuberance has an axial thickness S less than the corresponding upper 64 or lower 80 seal, said axial thickness S being measured parallel to a direction coaxial to a hole of the eyelet 16.

In this way, as long as the upper or lower seal 64, is present, due to the fact that its thickness is greater than that of the protuberance 96, it prevents the latter from going into abutment.

It should be noted that the thickness of the upper or lower seal 64, 80 must be larger than that of the corresponding protuberance 96a, 96b also in a deformed configuration, by axial compression, of the same seal following assembly and tightening of the inlet plug 20.

Therefore, in the assembly condition of the seal 64, 80, the protuberance 96 does not interfere with the seal itself.

If the seal 64, 80 is not installed, the protuberance works by abutting and thus creating an interspace 100 which constitutes a facilitated and preferential fluid passage. This fluid passage or leakage allows immediately identifying the absence of the seal, due to an error in the assembly step.

According to a possible embodiment, the protuberance 96 is formed on the eyelet 16, in particular on the upper surface 68 and/or on the lower surface 84.

For example, the at least one protuberance 96 is obtained by spot facing or flaring of the corresponding upper or lower surface of 68, 84 the eyelet 16.

Preferably, said spot facing or flaring has a superficial roughness with a circular pattern.

Preferably, said protuberance 96 is comprised between each upper and lower surface 68, 84 of the eyelet 16 and the corresponding head or base 72, 88.

In this way, it is possible to easily detect the absence of both the upper seal 64 and the lower seal 80.

Preferably, the protuberance 96, with respect to a radial direction R-R, incident to an axial direction X-X parallel to an axis of the hole 52, is positioned externally to the respective seal 64, 80.

This prevents the protuberance 96 from interfering with the seal itself.

Preferably, the head 72 of the inlet plug 20, with respect to the radial direction R-R, has a radial size such as to abut at least partially with the upper protuberance 96a, in the absence of the upper seal 64. In this way, in the absence of the upper seal 64, the upper protuberance 96a is able to create the corresponding interspace 100.

According to an embodiment, the base 88 of the block comprises a flattening 92 adapted to house at least partially the lower seal 80. Said flattening 92, with respect to a radial direction R-R, has a radial size such as not to completely house the lower protuberance 96b, in the absence of the lower seal 80.

According to a possible embodiment, at least one protuberance 96 is obtained by spot facing or flaring of the corresponding head 72 of the inlet plug 20 or base 88 of the block 32.

Preferably, said spot facing or flaring has a superficial roughness with a circular pattern.

As can be appreciated from the description, the present invention allows overcoming the drawbacks of the prior art.

First of all, the present invention has a wide application range, since it is applicable on all the connections of hydraulic systems such as brake calipers, pumps, ABS control units, valves and the like.

Moreover, the invention ensures, on the assembly line, by means of a 100% sealing test, therefore it is possible to remove the timers of the washers, present in the solutions of the prior art.

As seen, the invention allows identifying the absence of both the upper seal on the inlet plug and the lower seal on the nut screw or block.

In fact, due to the protuberance, in the absence of a seal, the protuberance automatically generates an interspace that allows an immediate leakage of hydraulic fluid during the sealing test step. In this way, the assembly error is immediately identified on each hydraulic component of the assembly line.

Furthermore, the invention is also applicable in the presence of anti-rotation devices 104 (FIG. 3a), moving the raised floor from the opposite side.

Advantageously, the invention does not involve any significant modification of the process for obtaining the connector and the assembly process of the system.

Furthermore, no significant variation of the appearance of the connector once assembled is required.

Moreover, due to the connector according to the invention, the possible returns from the customer due to the lack of washers and therefore to the occurrence of potential leakage during the lifetime of the vehicle are eliminated.

A man skilled in the art may make several changes and adjustments to the various embodiments described above in order to meet specific and incidental needs, all falling within the scope of protection defined in the following claims.

The invention claimed is:

1. A hydraulic component, for braking systems and/or clutch drives, comprising:
   at least one connector fitted with a supply pipe, suitable for receiving incoming hydraulic fluid, and an eyelet that sends the fluid in output, wherein said eyelet has an upper surface and a lower surface,
   an inlet plug with a hollow cylindrical body that receives the fluid in output from the eyelet and brings it into a supply channel made on a block or nut screw, wherein said inlet plug has a head above said hollow cylindrical body, wherein a collar extends about said head, wherein said collar at least partially radially overlaps said upper surface, wherein said block has a base, wherein said lower surface at least partially radially overlaps said base,
   the inlet plug being inserted coaxially to a hole delimited by the eyelet,
   wherein between at least one of said upper and lower surfaces of the eyelet and the corresponding head or base a protuberance of said at least one connector is interposed, respectively, above or below, wherein between the upper or lower surfaces and the collar or the base, respectively, an interspace is created,
   wherein said interspace has an outer rim defined by the protuberance at a first axial height partially surrounding an inner rim being recessed below the protuberance of a second axial height that is less than the first axial height, wherein said inner rim is adapted to receive a seal.

2. The hydraulic component according to claim 1, in which said lower or upper protuberance has an axial thickness less than a corresponding upper or lower seal said axial thickness being measured parallel to a direction coaxial to a hole of the eyelet.

3. The hydraulic component according to claim 1, wherein said protuberance is configured in such a way that in the assembled configuration, it does not interfere with a corresponding upper or lower seal.

4. The hydraulic component according to claim 1, wherein the protuberance is made on the eyelet.

5. The hydraulic component according to claim 1, wherein said protuberance is between each upper and lower surface of the eyelet and the corresponding head or base.

6. The hydraulic component according to claim 1, wherein the protuberance, with respect to a radial direction, incident to an axial direction parallel to an axis of the hole, is positioned externally to a respective upper or lower seal.

7. The hydraulic component according to claim 1, wherein the head of the inlet plug, with respect to a radial direction, incident to an axial direction parallel to an axis of the hole, has radial dimensions such as to abut at least partially with the upper protuberance.

8. The hydraulic component according to claim 1, wherein the base of the block comprises a flattening suitable to house at least partially a lower seal, said flattening, with respect to a radial direction, incident to an axial direction parallel to an axis of the hole, has radial dimensions such as to not to house the lower protuberance.

9. The hydraulic component according to claim 1, wherein at least one protuberance is obtained by spot facing or flaring of the corresponding upper or lower surface of the eyelet.

10. The hydraulic component according to claim 9, in which the spot facing or flaring has a surface roughness of a circular pattern.

11. The hydraulic component according to claim 1, wherein at least one protuberance is obtained by spot facing or flaring of the corresponding head of the inlet plug or base of the block.

12. The hydraulic component according to claim 1, wherein the inlet plug comprises a radial duct in fluidic communication with the hole of the eyelet and an axial duct, connected to the radial duct and converging in the supply channel.

13. The hydraulic component according to claim 1, wherein the supply channel of the screw nut is threaded and receives in screwing a screw thread made on an outer side wall of the inlet plug.

14. The hydraulic component according to claim 1, wherein a fluid leak path extends from the upper or lower surfaces and the collar or the base, respectively, and a radial duct in said inlet plug and an adduction channel in said connector.

* * * * *